March 5, 1957 V. C. JOHNSON 2,783,664
TURRET ATTACHMENT FOR LATHES
Filed Oct. 11, 1954 2 Sheets-Sheet 1
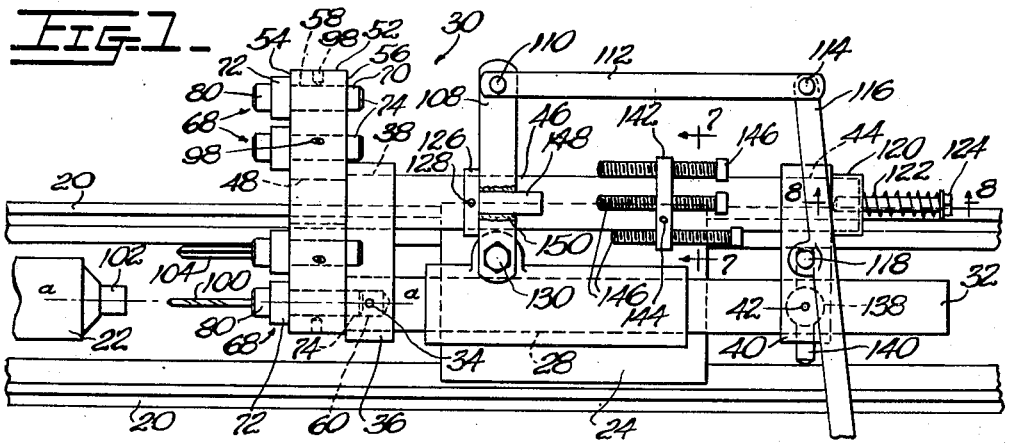
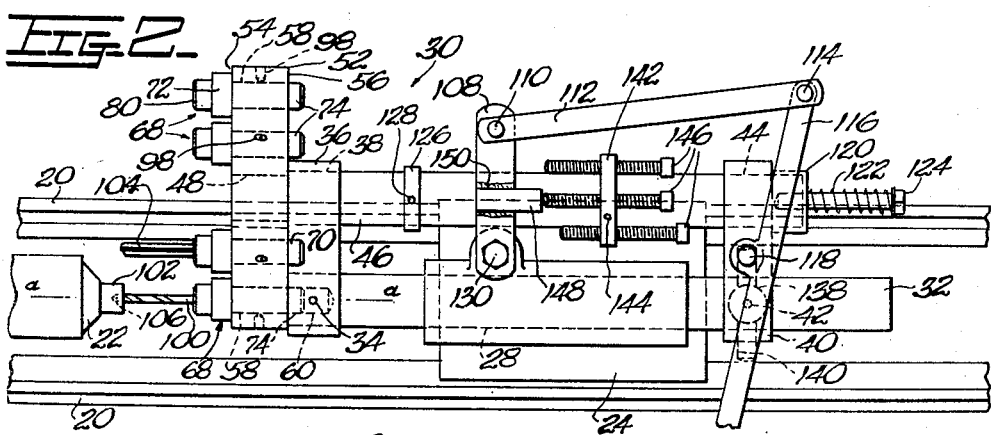
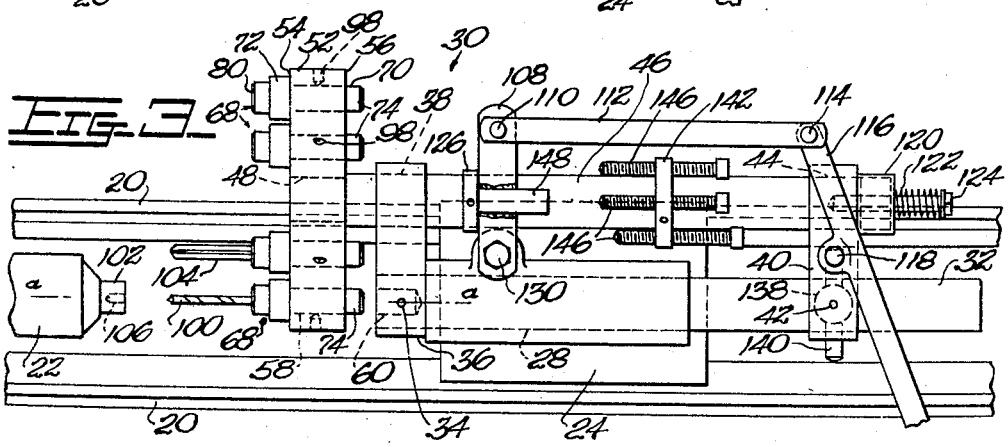
INVENTOR.
V. C. Johnson
BY
Atty.

March 5, 1957   V. C. JOHNSON   2,783,664
TURRET ATTACHMENT FOR LATHES
Filed Oct. 11, 1954   2 Sheets-Sheet 2
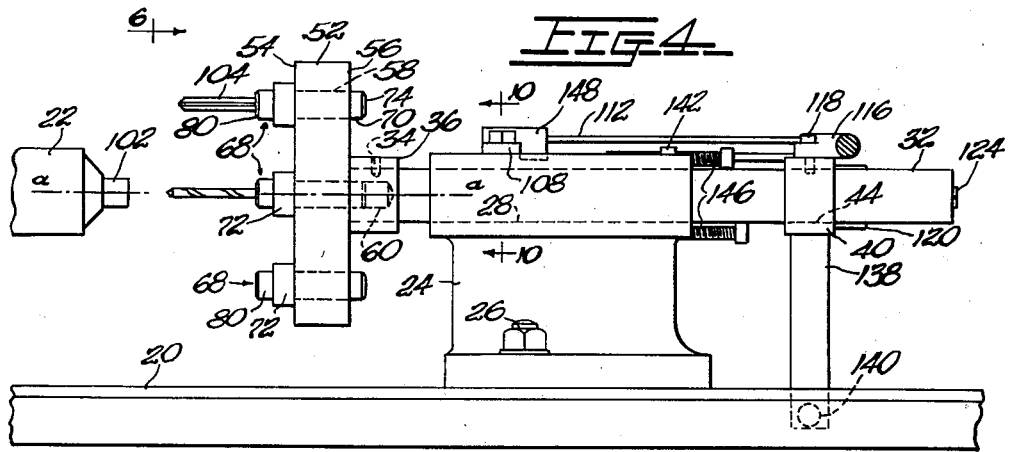
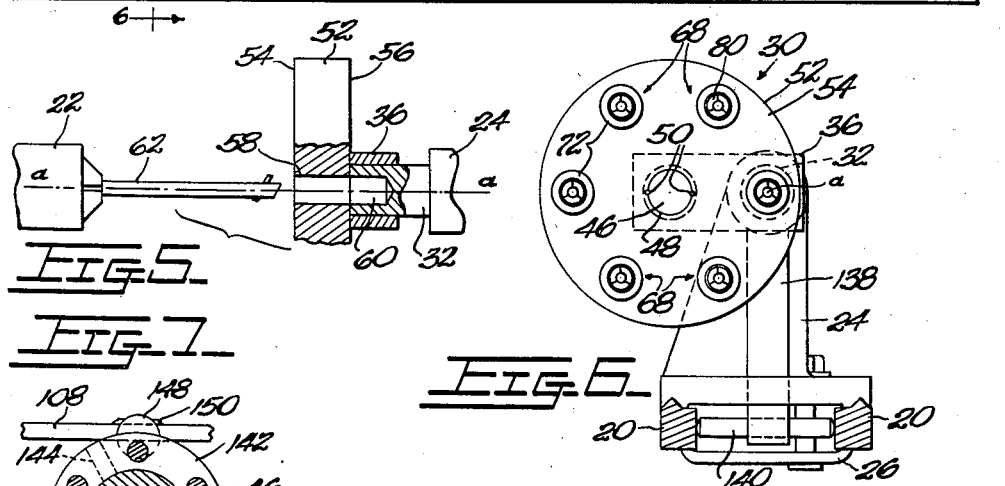
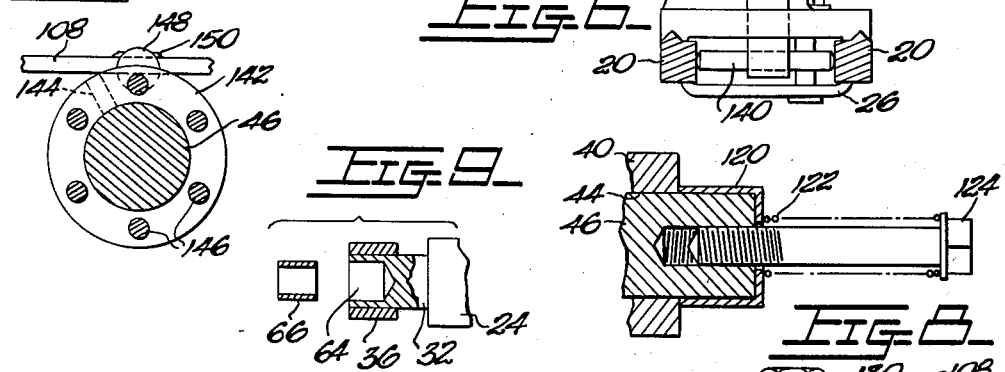
INVENTOR.
V. C. Johnson
BY
Atty.

United States Patent Office 2,783,664
Patented Mar. 5, 1957

2,783,664

TURRET ATTACHMENT FOR LATHES

Victor C. Johnson, Davenport, Iowa

Application October 11, 1954, Serial No. 461,635

6 Claims. (Cl. 77—25)

This invention relates to a turret attachment for a lathe and more particularly to a simple and inexpensive attachment that may be used primarily on lathes of the type in which the axis of the coaxial headstock and tailstock is horizontal.

It is an important object of the invention to provide an attachment including a support that may be used in the tailstock spindle bore, from which the spindle has been removed for the purposes of accommodating the attachment. The support as thus constituted carries a rotatable shaft on which is mounted a turret head, the axis of the turret head and shaft being parallel to the axis of the support. The turret head has a plurality of uniformly angularly spaced tool holders having their axes respectively parallel to the turret head axis and lying on a circle having as its radius the distance between the turret head and headstock axes, so that upon selective angular positioning of the turret head, one of the tool holders will be coaxial with the headstock.

A further feature of the invention resides in the utilization of the support in such manner that when originally provided it is adapted to be bored from the headstock of the lathe on which it is used, thereby providing true coaxiality, whereby the tools used in the tool holder of the turret head will be selectively coaxial with the work piece carried by the headstock. As a further adjunct to the invention, it is an important object to provide improved tool holders, each being of a relatively small size and, although intended primarily for use in a turret attachment of the type herein disclosed, being also adaptable for use in other instances to hold relatively small tools for small precision work. Each tool holder features a tubular construction containing tool-gripping means in the form of a collet having a threaded internal end with which a rotatable internally threaded drawbar is cooperative.

A still further object of the invention is to utilize projecting portions of the tool holder as respective locking portions cooperative with a lock element on the support, the preferred design featuring the aforesaid bore in the support on the headstock axis which is selectively adapted to receive the lock portions of the tool holders, in conjunction with which it is an object of the invention to mount the support and turret head for movement in unison, to accomplish work-performing operations, and to move the turret and support relative to each other in an axial direction to disengage the received tool holder lock portion from the locking bore or element in the support. In its broader aspects, the invention is characterized by the use of the tool holders as lock portions cooperative with any form of lock element on the support.

The foregoing and other important objects and desirable features inherent in and encompassed by the invention will become apparent as a preferred embodiment of the invention is disclosed in detail in the following description and accompanying sheets of drawings, the several figures of which will be described immediately below.

Fig. 1 is a fragmentary plan view of the attachment as mounted on a lathe, showing the support and turret head in what may be termed a starting position.

Fig. 2 is a similar plan view, but showing the turret head and support in a working position.

Fig. 3 is a similar plan view but showing the support separated from the turret head so as to release the turret head for angular repositioning.

Fig. 4 is a side elevational view of the structure shown in Fig. 1.

Fig. 5 is a fragmentary elevational view, partly in section, showing one method of forming a locking element or bore in the front end of the support.

Fig. 6 is an end view, partly in section, as seen along the line 6—6 of Fig. 4.

Fig. 7 is a fragmentary sectional view on an enlarged scale as seen along the line 7—7 of Fig. 1.

Fig. 8 is a fragmentary sectional view on an enlarged scale as seen along the line 8—8 of Fig. 1.

Fig. 9 is a modification of the structure in Fig. 5, representing the use of an insert in the locking bore.

Fig. 10 is a fragmentary sectional view on an enlarged scale as seen along the line 10—10 of Fig. 4.

Fig. 11 is an enlarged longitudinal sectional view through one of the tool holders.

The lathe selected for the purposes of illustration comprises a pair of horizontal ways 20 carrying a headstock, represented here by a rotatable chuck 22, and a tailstock 24. The headstock and tailstock are horizontally coaxial on an axis $a$—$a$. The tailstock is conventionally mounted on the ways 20 by means including a bolt-controlled clamp 26 (Figs. 4 and 6) and in the normal use of the attachment provided according to the present invention, the position of the tailstock is secured and for all practical purposes the tailstock may be considered fixed.

The tailstock has therein an axial spindle bore 28 on the axis $a$—$a$. In the preferred embodiment of the invention, the tailstock spindle (not shown) has been removed so that the tailstock is adapted to carry the turret head attachment, which attachment is indicated in its entirety by the numeral 30.

The attachment comprises essentially a support or support bar 32, here cylindrical in section so as to be slidably received in the tailstock bore 28. This bar has a front end ahead of and a rear end behind the tailstock and rigidly affixed to the front end of the bar, as by a set screw 34, is a radial arm 36, in the free end of which is formed a bore 38 on an axis parallel to the headstock axis $a$—$a$ which axis is, of course, the axis of the tailstock and of the support bar 32. A rear arm 40 is fixed to the rear portion or end of the support bar 32, affixation being accomplished by means of a set screw 42. The free end of the rear arm is bored at 44 coaxially with the bore 38 in the front arm 36 and these arms, in conjunction with the bar 32, serve as support means for mounting or carrying a fore-and-aft extending turret head shaft 46. Here, as in the claims, the expressions "front," "rear," "fore-and-aft," etc. are used with reference to the headstock being at the "front" of the lathe; although, other arrangements may be used and the geographical descriptions are used for purposes of convenience and not in any limiting sense.

The turret head shaft 46 is cylindrical and is carried in the arm bores 38 and 44 for both angular and axial movement relative to the support bar 32 and arms 36 and 40 on the principal axis of the shaft which, as will be readily seen, is parallel to the headstock axis $a$—$a$. The front end of the turret head shaft 46 is reduced at 48 and has fixed thereto, as by axially directed set screws 50 (Fig. 6), a turret head 52. The turret head is of plate-like structure and, being circular, has an annular portion radially overlapping the front end of the support bar 32 as represented by the front support arm 36. The turret head has front and rear radial faces 54 and 56 respectively, the rear one of which normally abuts the front face of the front support arm 36. The turret head is further provided with a plurality of through bores 58 which lie respectively on axes parallel to the turret head and turret shaft axis; and these axes lie on a circle having the turret head axis as its center and having as its radius the distance between the turret head and headstock axes, so that when the turret head is rotated, the axes of the through bores 58 successively coincide coaxially with the headstock axis a—a.

The turret head attachment 30 may be sold in such condition that the front end of the support bar is blank; that is, it will not originally have therein a forwardly opening bore 60 on the headstock axis. This locking bore, which constitutes a locking element as will hereinafter appear, may be formed in accordance with the illustration in Fig. 5; that is to say, the support bar 32 is mounted in the tailstock of the lathe on which the attachment 30 is to be used. A boring bar 62 is chucked in the headstock chuck 22 to form the bore 60, thereby assuring that the bore 60 will be bored on the headstock axis a—a. In the modification shown in Fig. 9, an axial bore 64 may be similarly bored from the headstock, this bore being larger than the bore 60, but the difference in diameter being made up by a hardened tubular insert 66 which has an inside diameter equal to the inside diameter of the bore 60 of Fig. 5, for example. Because of the locking function of the bore 60, it may be preferable to use the insert 66 in the larger bore 64. Nevertheless, for all practical purposes the function is the same and for purposes of convenience, reference will hereinafter be made to the locking element in the support bar 32 as constituting the bore 60.

The turret head carries a plurality of tool holders 68, which tool holders are mounted respectively individually in the through bores 58. The construction of each tool holder is shown best in Fig. 11, wherein it is shown that the tool holder has a tubular member or body 70 of cylindrical construction having front and rear ends 72 and 74 respectively, both of which ends open axially outwardly. The tubular structure of the member 70 is comprised by an internal bore 76 which opens at the front end 72 of the member 70 as an internally conical surface 78 which cooperates with tool-gripping means in the form of a collet 80. The internal portion of the collet is in the form of a shank 82 having integrally coaxial therewith a rear threaded portion 84 loosely received in a rear counterbore 86 in the tubular member 70. The counterbore carries rotatably therein a cylindrical drawbar or actuating member 88, which member is internally threaded at 90 to cooperate with the threaded portion 84 on the collet 80. The drawbar or member 88 is also axially socketed at 92 to receive a wrench of the so-called "Allen" type, access to the socket 92 being thus from the open rear end 74 of the tool holder. It will be noted that the drawbar 88 is contained wholly within the rear end of the member 70.

The outside diameter of the cylindrical member 70 is such as to be tolerably received in a respective through bore 58 in the turret head 52. Although the tool holders 68 are primarily useful with a turret head 52 of the character disclosed, they may be conveniently and successfully used in other instances in which relatively small tool holders are required, such as in drill presses, etc.

The collet 80 is keyed at 94 to the member 70 so as to be held against angular movement relative to the member 70 but capable of having axial movement. The junction of the counterbore 86 with the bore 76 forms an annular shoulder 96 against which the inner or forward end of the drawbar 88 abuts. Thus, as the drawbar is rotated selectively in opposite angular directions, the collet is moved axially or expelled and repelled, effecting a gripping action at the front end of the collet in an obvious manner.

Each tool holder 68 is received in the turret head 52 via its respective bore 58 and is removably fixed in place in the turret head as by a set screw 98. As seen, the front end 72 of each member 70 constitutes a shoulder that limits rearward movement of the tool holder in the turret head. The length of the member 70 is such that its rear portion 74 projects rearwardly behind the rear face 56 of the turret head. As previously stated, it is a feature of the invention to utilize the rearwardly projecting portions 74 of the tool holders 68 as lock portions cooperative with the lock element established by the locking bore 60 in the support bar 32. This will be apparent from comparing Figs. 1, 2 and 3, Fig. 1 showing that the tool holder that lies on the axis a—a has its rear portion 74 received in the locking bore 60 of the support bar 32, the rear portions 74 of the other tool holders 68 being clear of the arm 36 as well as being clear of the support bar 32. In this position of the coaxial tool holder 68, it may receive a working tool such as a drill 100 for drilling a coaxial work piece 102 chucked in the chuck 22 of the headstock. In other words, the cooperation between the locking portions 74 of the coaxial tool holders 68 and the lock element established by the support bar bore 60 holds the turret head against angular changes in position relative to the support bar and therefore keeps the drill 100 on the axis a—a. Since the support bar bore 60 is originally bored on the headstock axis, true coaxial alinement is assured. When the turret head and support structure 32—36 are axially separated (Fig. 3), the lock portions 74 of all tool holders 68 are cleared from the locking bore 60 and the turret is free to have its angular position changed about its own axis. The successive tool holder 68 may carry another tool, here shown as a reamer 104. When the turret head and supporting structure are restored to their positions as illustrated in Fig. 1, but with the next successive tool holder 68 having its portion 74 engaged in the support bar bore 60, the reamer 104 will then be coaxial with the work piece 102, in which the drill 100 has already formed a small bore 106. Successive tools mounted on the remaining tool holders (which tools are not shown but are readily obvious) may thus be brought successively or selectively into position to perform other operations on the work piece 102 where the criterion is true coaxial alinement.

When the turret head and support structure 32—36 are locked up as shown in Fig. 1, they are movable in unison along the axis a—a or forwardly toward the work piece 102 in the headstock chuck 22, which result is possible because, as previously described, the support bar 32 is axially slidable in the tailstock bore 28. When the support bar 32 moves axially forwardly, it carries with it the turret head 52, since the front support arm 36 abuts the rear face 56 of the turret head, this constituting first one-way drive means for carrying the turret head in unison with axial shifting of the bar 32. Movement of the two in unison is effected by operating means comprising a fixed arm 108 having means thereon for the rigid affixation thereof to the tailstock 24, which means will be described in detail below. The free end of the arm 108 has a pivot portion 110 to which is connected the front end of a rearwardly extending link 112. The rear end of the link 112 is pivotally connected at 114 to one end of an operating lever 116, which lever is fulcrumed intermediate its ends at 118 on an intermediate portion of the rear support arm 40. As the lever 116 is swung in a forward direction (Fig. 2), it exerts a forward force on the support bar 32, driving the support bar forwardly and causing the turret head 52 to move in unison therewith because of the abutting relation between the front support arm 36 and the rear face 56 of the turret head. Force applied to this lever as shown in Fig. 2 will engage a tool-holder-carried tool with the work piece 102 in the headstock chuck 22. After the drilling or reaming operation has proceeded to the necessary degree, the lever 116 is swung rearwardly to return to the position of Fig. 1.

In order that the turret head 52 will return rearwardly with the support bar 32, second one-way drive means is provided, this means including the rear face of the rear arm 40 and a cap 120 coaxially received by the rear end of the turret shaft 46 and held in a normal position by a spring 122 wrapped about a bolt 124 threaded coaxially into the rear end of the turret shaft 46. The spring load 122 is sufficient to cause the turret head 52 to move rearwardly with the support bar 32 to a point established by a stop in the form of a collar 126 fixed to the turret shaft 46 as by a set screw 128.

The stop collar 126 is so positioned that when the support bar and turret shaft are in the position shown in Fig. 1, the collar abuts the front of the fixed arm 108, thus limiting rearward movement of the shaft 46 and turret head 52. Because of the presence of the spring and cap 102, the stop means thus constituted is yieldable to permit the bar 32 to overrun or travel rearwardly beyond the stopped position of the turret shaft 46 (Fig. 3). When such overtravel occurs, the front support arm 36 is separated from the turret head 52, thus causing the coaxial tool holder 68 to be axially withdrawn from the support bar locking bore 60. Hence, the turret head 52 is now free to be rotated about its own axis for selecting a new angular position thereof; that is, a successive or any other tool holder may be selectively chosen for re-locking in the locking bore 60, after which the lever 116 may be returned to the position of Fig. 1 to re-establish the normal relationship of the parts.

The details of the second one-way drive means are shown in Fig. 8, wherein it will be seen that the purpose of the cap 120 is to provide means abutting the rear face of the rear arm 40, so that the spring load is applied against the arm 40 and not against the turret shaft 46.

The details of the mounting of the fixed arm 108 are best shown in Fig. 10, wherein it will be seen that a cap screw 130 is threaded into a tapped bore 132 conventionally provided in most lathe tailstocks for receiving the spindle clamp. A cooperative locking member 134 is used in the assembly but its function as locking the spindle or as locking the support bar is negatived by the use of a pair of spacers or washers 136.

In order that the attachment may occupy a definite position relative to the tailstock, and since the support bar 32 is both axially as well as rockably carried in the tailstock bore 28, a depending arm 138 (Fig. 6) is rigidly affixed to the support bar 32 and projects between the ways 20, having at its lower end a cross member 140 which engages and rides against the inner edges of the ways. This means thus prevents rocking of the support bar 32 in the tailstock bore 28.

Selective limits on forward movement of the support bar 32 and turret head structure in unison is established by stop means including an annulus 142 fixed, as by a set screw 144 to the turret shaft 46 behind the fixed arm 108. Axial adjustment of the annulus 142 on the turret shaft 46 may be accomplished by loosening and tightening the set screw 144.

The annulus 142 is provided with a plurality of circumferentially spaced bores, equal in number to the tool holder 68 and corresponding in angular position to the tool holder 68 about the turret shaft and turret head axis. Each of the tapped bores in the annulus receives an adjustable stop member in the form of an elongated threaded screw 146, each of which may be individually adjustable to establish the point at which it will engage with a rigid stop or abutment 148 fixed, as by welding at 150, to the fixed arm 108. Adjustment of the screw 146 that corresponds to whichever tool holder 68 is on axis $a$—$a$ determines the depth or other work-performing limit on the tool carried by that tool holder.

The preferred operation of the structure has been set forth in detail in the foregoing description and need not be repeated. Various specific features of the invention not categorically enumerated herein will undoubtedly occur to those conversant with the art to which the present invention relates, all of which may be achieved, as may modifications and alterations of the preferred structure illustrated, without departing from the spirit and scope of the invention.

What is claimed is:

1. A turret attachment for a lathe including horizontal ways on which is mounted a tailstock of the type having a single horizontal sleeve carrying a removable spindle and wherein the sleeve has an upright tapped bore alongside the spindle and receiving a removable spindle clamp, said attachment comprising: a cylindrical support bar axially slidably received in the tailstock sleeve in place of the removed spindle and having front and rear ends to project respectively forwardly and rearwardly beyond the sleeve; front and rear radial arms rigid respectively on the front and rear ends of the bar and having free ends bored coaxially on an axis parallel to the bar axis; a shaft journaled and axially slidably carried in said bores and having front and rear ends projecting respectively ahead of and behind the front and rear arms; tool-supporting turret means on the front end of and rotatable with the shaft; and control means for shifting the shaft axially relative to the arms, including a lever pivoted intermediate its ends on an upright pivot to the rear radial arm and having one end projecting outwardly over the shaft and including a pivot; a control arm including a threaded fastener received in the spindle-clamp bore in place of the removed spindle clamp to effect rigid mounting of said pivot arm on the tailstock sleeve so that said pivot arm projects outwardly over the shaft to a free end having a pivot thereon, and a link pivotally connected at one end to the free-end pivot of the lever and pivotally connected at its other end to the free-end pivot of the control arm.

2. The invention defined in claim 1, including: a guide rigid on and depending from the rear radial arm and engageable with and for riding the ways to prevent angular rocking of the bar in the sleeve.

3. The invention defined in claim 1, including: axially separable lock means including elements respectively on the bar and turret means and normally engaged upon movement of the bar forwardly relative to the shaft and turret means and disengageable upon movement of the bar rearwardly relative to the shaft and turret means; yieldable means normally connecting the shaft and bar for rearward movement in unison; and a stop rigid on the shaft ahead of the control arm and engageable with said control arm upon rearward axial shifting of the shaft to halt the shaft while the bar continues rearwardly against the yieldable means, whereby to disengage the lock elements.

4. The invention defined in claim 1, in which: the turret means carries a plurality of tool holders, each tool holder having a rearwardly projecting end portion constituting one of the aforesaid lock elements, and the front end of the bar is socketed to receive the rear end portion of a selected tool holder and constituting the other of the aforesaid lock elements, and each tool holder is hollow and opens axially rearwardly at its rear portion and contains tool-clamping means, each tool-clamping means including an actuating member wholly contained within the rear portion and accessible through the respective open rear portion.

5. The invention defined in claim 1, in which: the turret means carries a plurality of individual tool holders spaced angularly about the shaft axis; a stop ring is carried by the shaft rearwardly of the control arm; and the stop ring carries a plurality of axially adjustable stops, equal in number to and angularly spaced about the shaft axis on the order of the tool holders, said stops being selectively engageable with the control arm to limit forward movement of the shaft and turret means.

6. A turret attachment for a lathe having horizontal ways carrying a horizontal axis headstock and a tailstock including a spindle bore coaxial with the headstock, said attachment comprising: a support having means thereon for the mounting thereof in the tailstock bore for movement toward and away from the headstock along the headstock axis, said support having a front end proximate to the headstock and formed with a forwardly opening bore coaxial on the headstock axis; a turret head mounted on the support for movement relative to the support both angularly about and axially along an axis parallel to the headstock axis, said turret head having therein a plurality of through bores respectively on axes parallel to the turret head axis and lying on a circle having said turret head axis as its center and having as its radius the distance between the turret head and headstock axes so that any selected one of said through bores is positionable in coaxial coincidence with the support bore when the turret head is angularly positioned about its own axis; a plurality of tool holders fixed to the turret head and respectively axially received in the through bores, each tool holder having a rearwardly projecting cylindrical portion of a size axially slidably receivable in the support bore according to the angular position of the turret head relative to the support; a single lever fulcrumed on the support and reacting on the tailstock so that force applied to the lever selectively in opposite direction causes forward and rearward axial movement of the support; a stop engageable with the turret head to limit rearward axial movement thereof; first one-way abutment means engageable between the support and turret head for carrying the turret head forwardly in unison with the support and away from said stop when the lever is moved in one direction; and second one-way abutment means engageable between the support and turret head for carrying the turret head rearwardly in unison with the support to engage the turret head with the stop when the lever is moved in the opposite direction, said second one-way means being rearwardly yieldable to afford rearward overtravel of the support relative to the turret head after the turret head engages the stop, whereby the support is separated axially rearwardly from the turret head to release the tool holder currently received in the support bore.

References Cited in the file of this patent

UNITED STATES PATENTS

| 674,177 | Von Pittler | May 14, 1901 |
| 2,517,043 | Smith et al. | Aug. 1, 1950 |

FOREIGN PATENTS

| 75,073 | Switzerland | May 16, 1917 |